Figure 1:
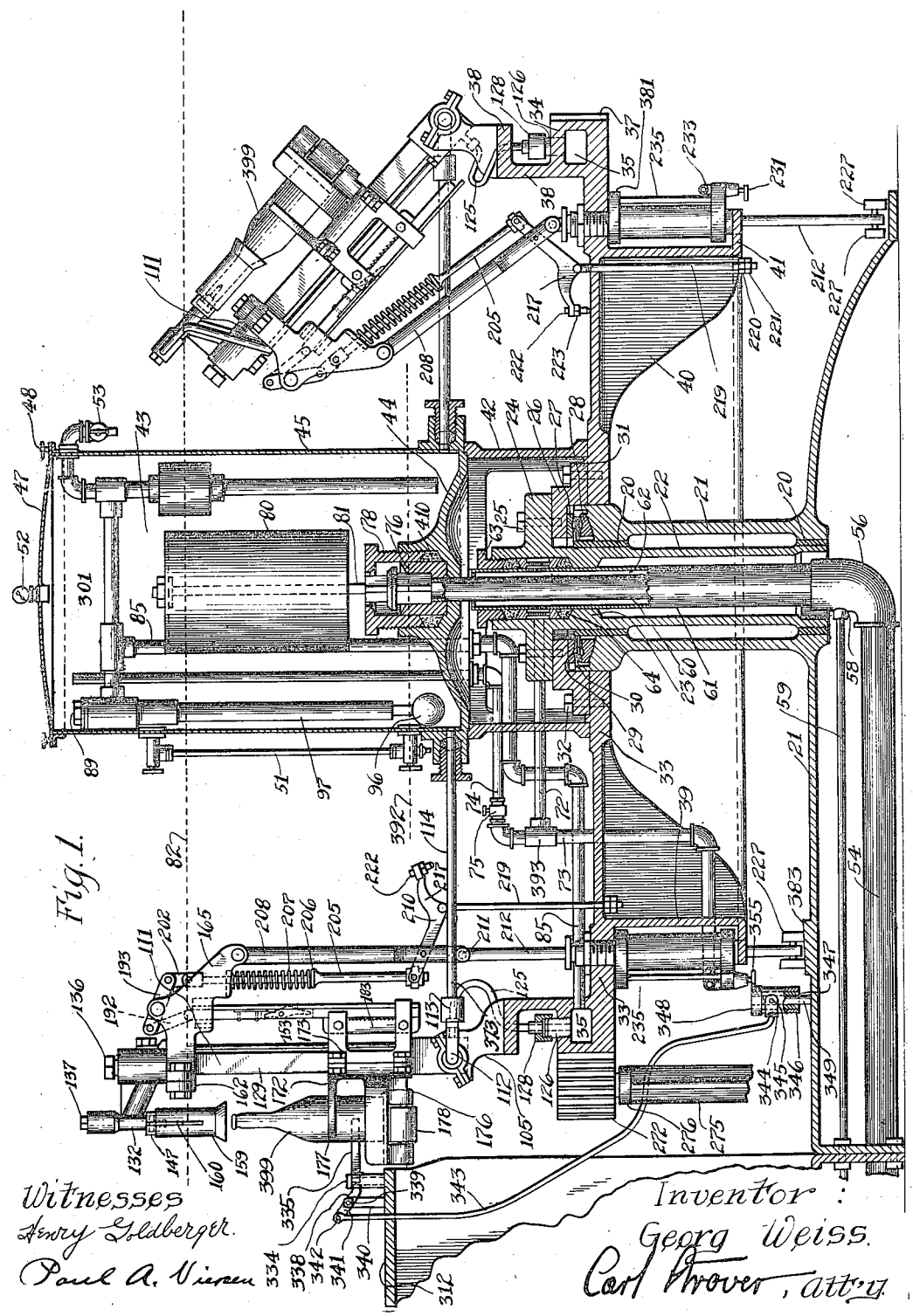

G. WEISS.
FILLING MACHINE.
APPLICATION FILED APR. 13, 1914.

1,224,249.

Patented May 1, 1917.
10 SHEETS—SHEET 1.

Witnesses
Henry Goldberger.
Paul A. Nieren.

Inventor:
Georg Weiss.
Carl Hrover, att'y

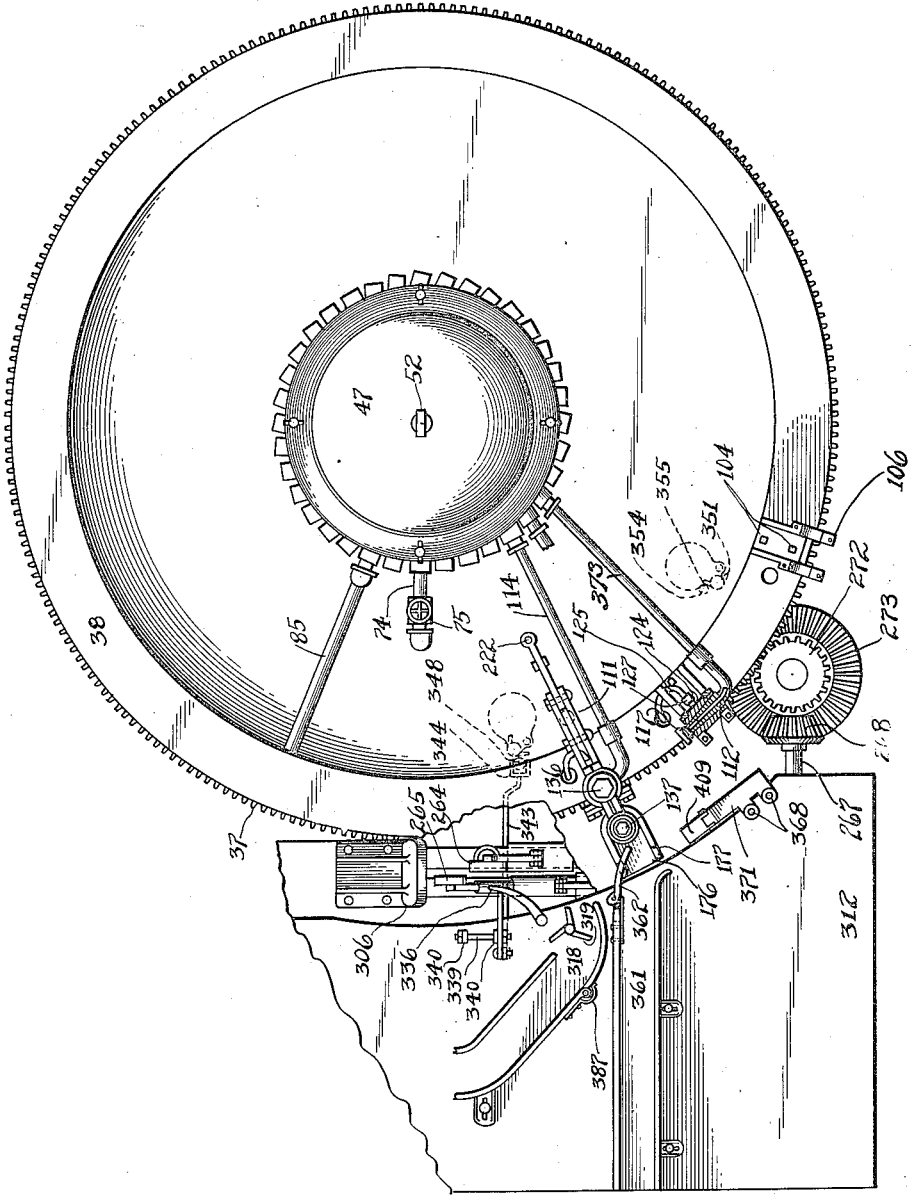

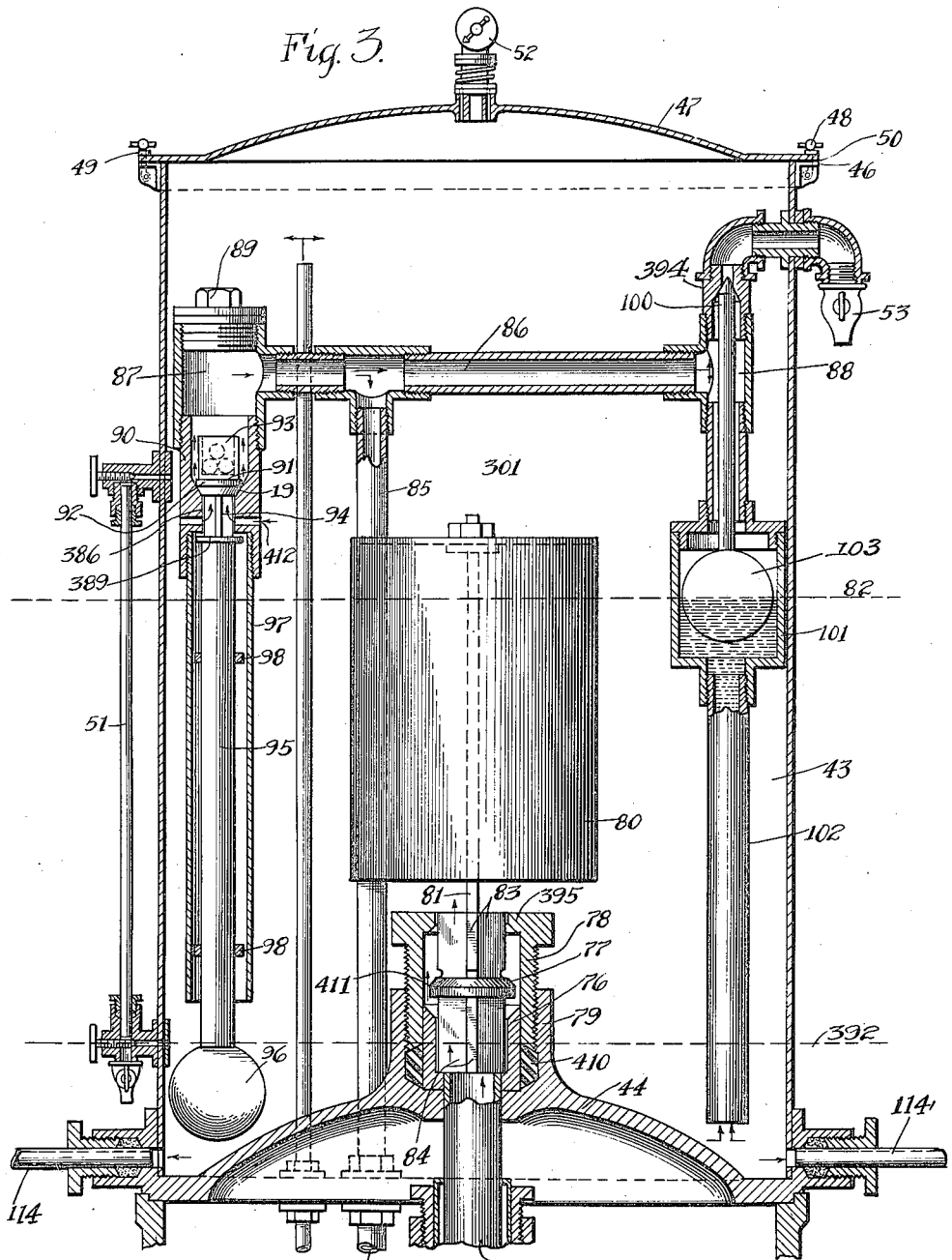

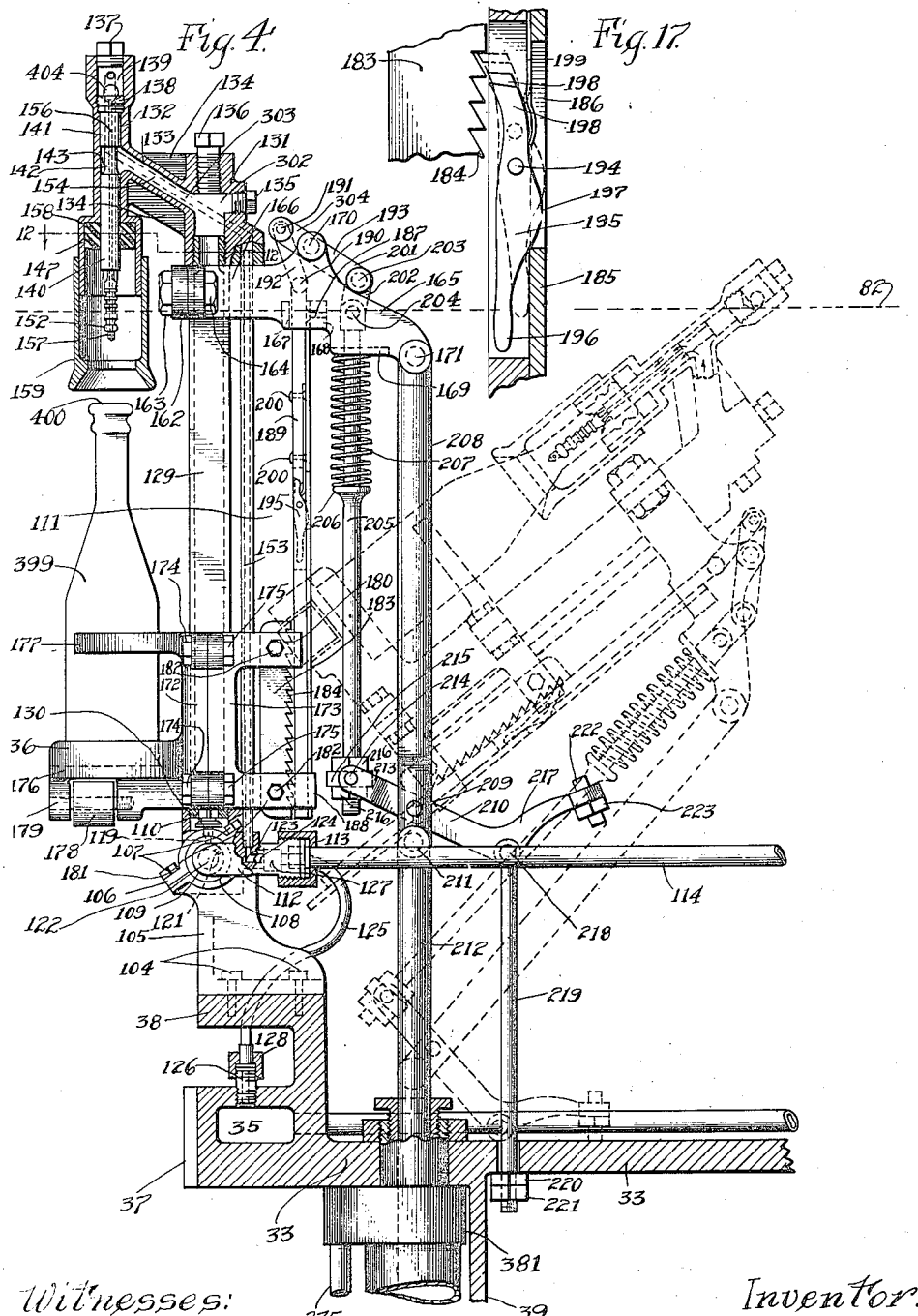

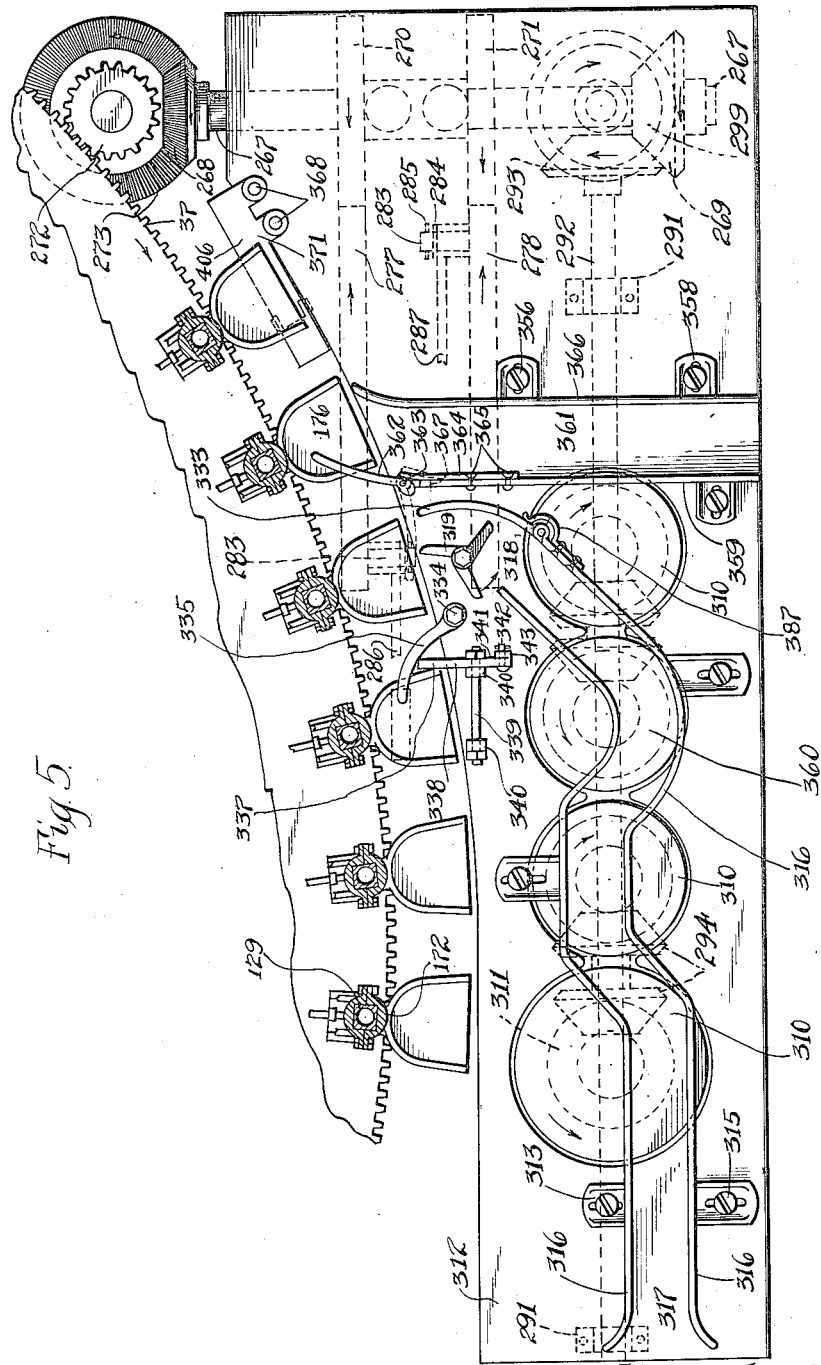

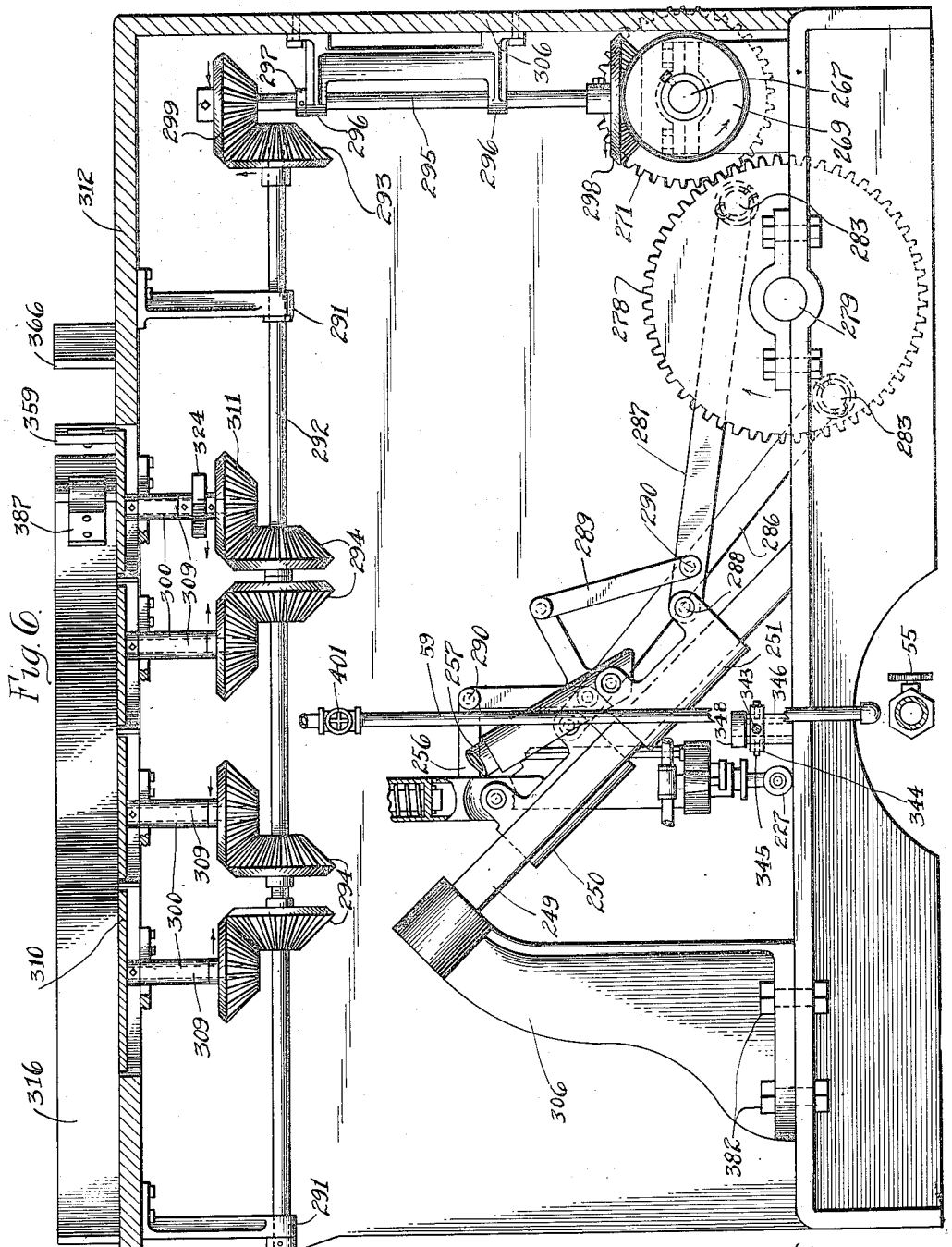

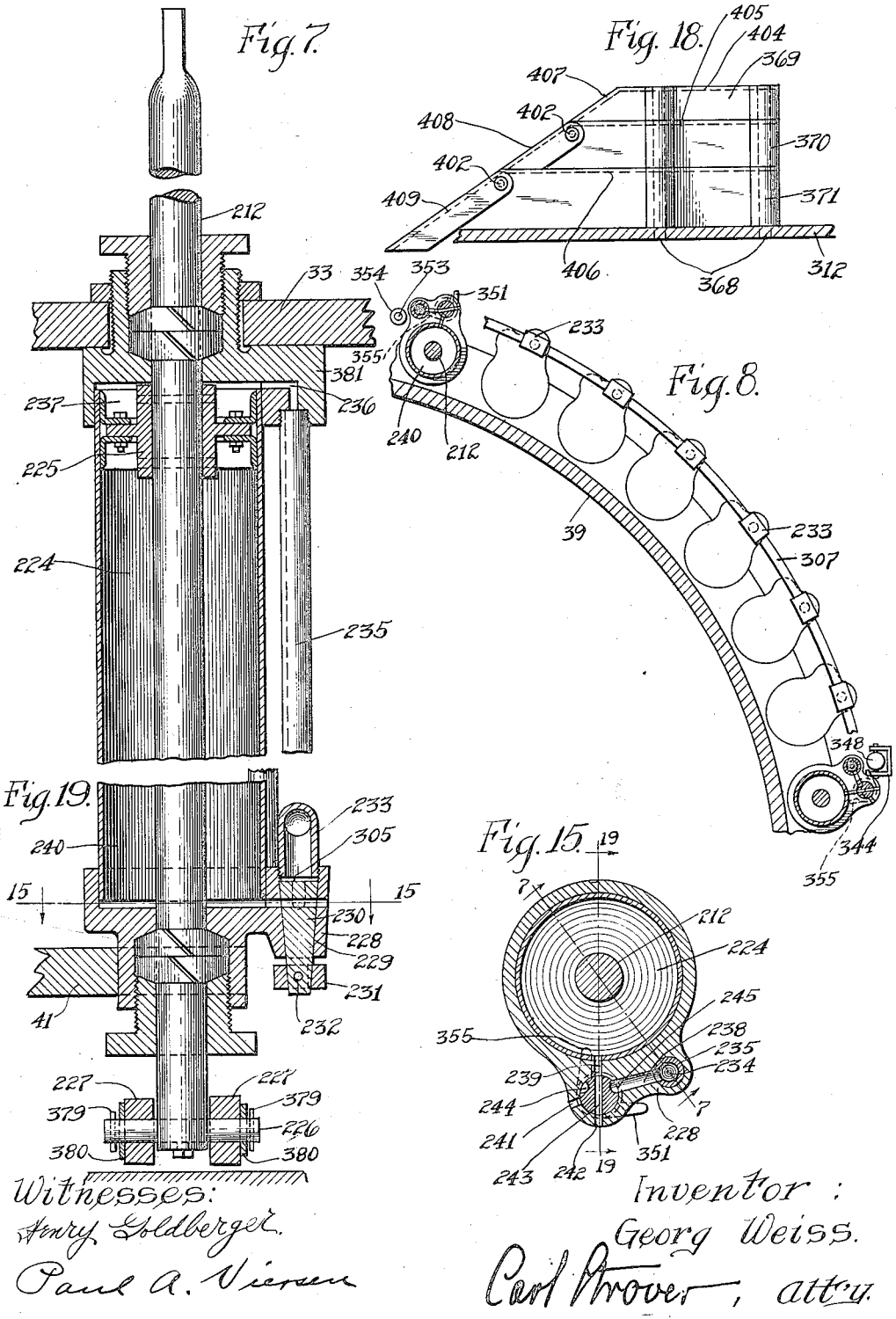

G. WEISS.
FILLING MACHINE.
APPLICATION FILED APR. 13, 1914.
1,224,249.
Patented May 1, 1917.
10 SHEETS—SHEET 8.
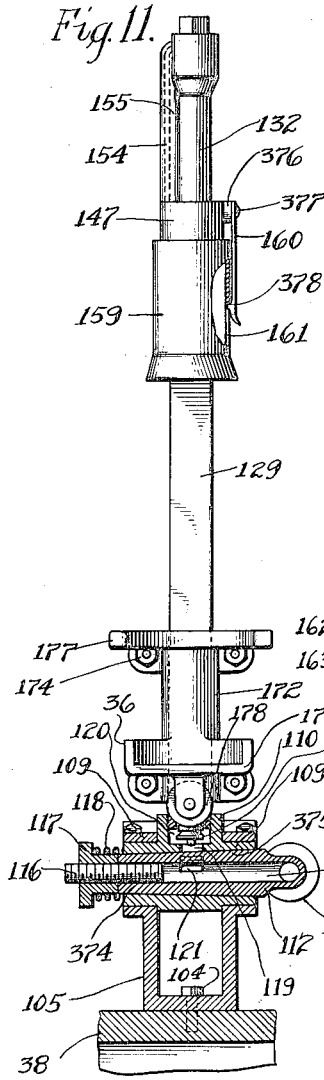
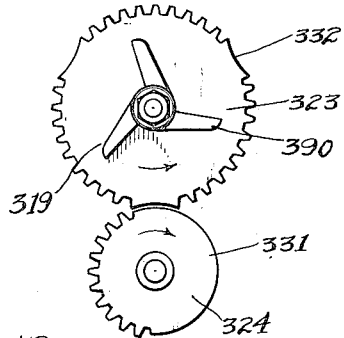
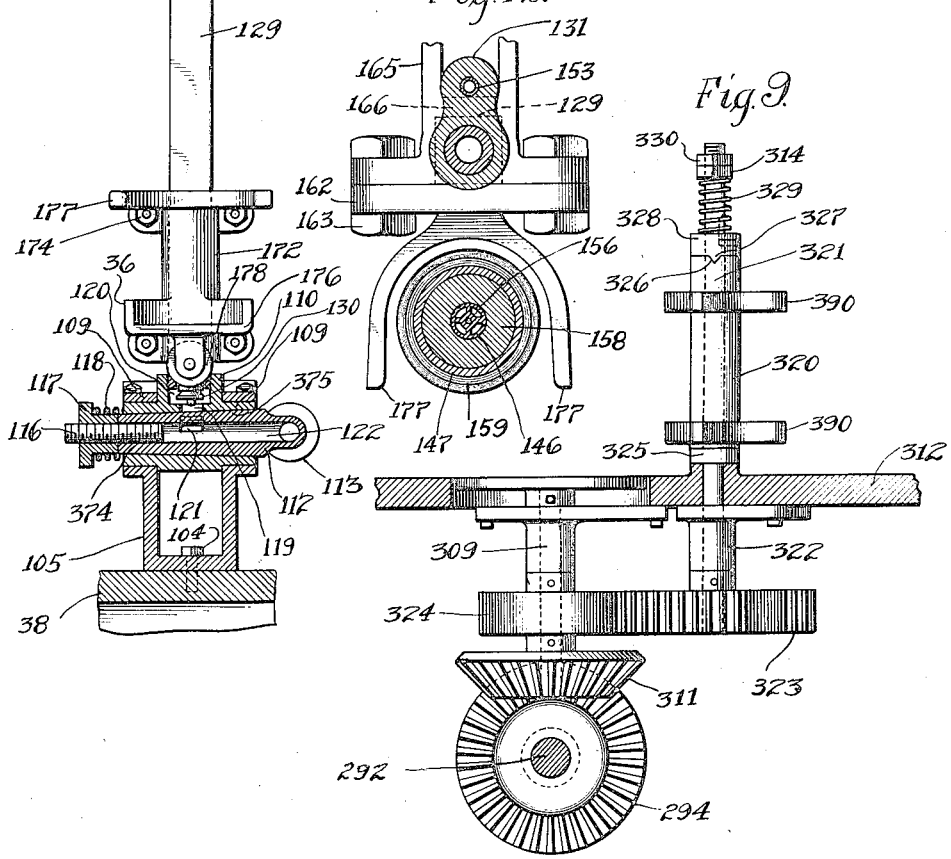
Witnesses:
Henry Goldberger
Paul A. Viersen
Inventor:
Georg Weiss.
Carl Strover, atty.

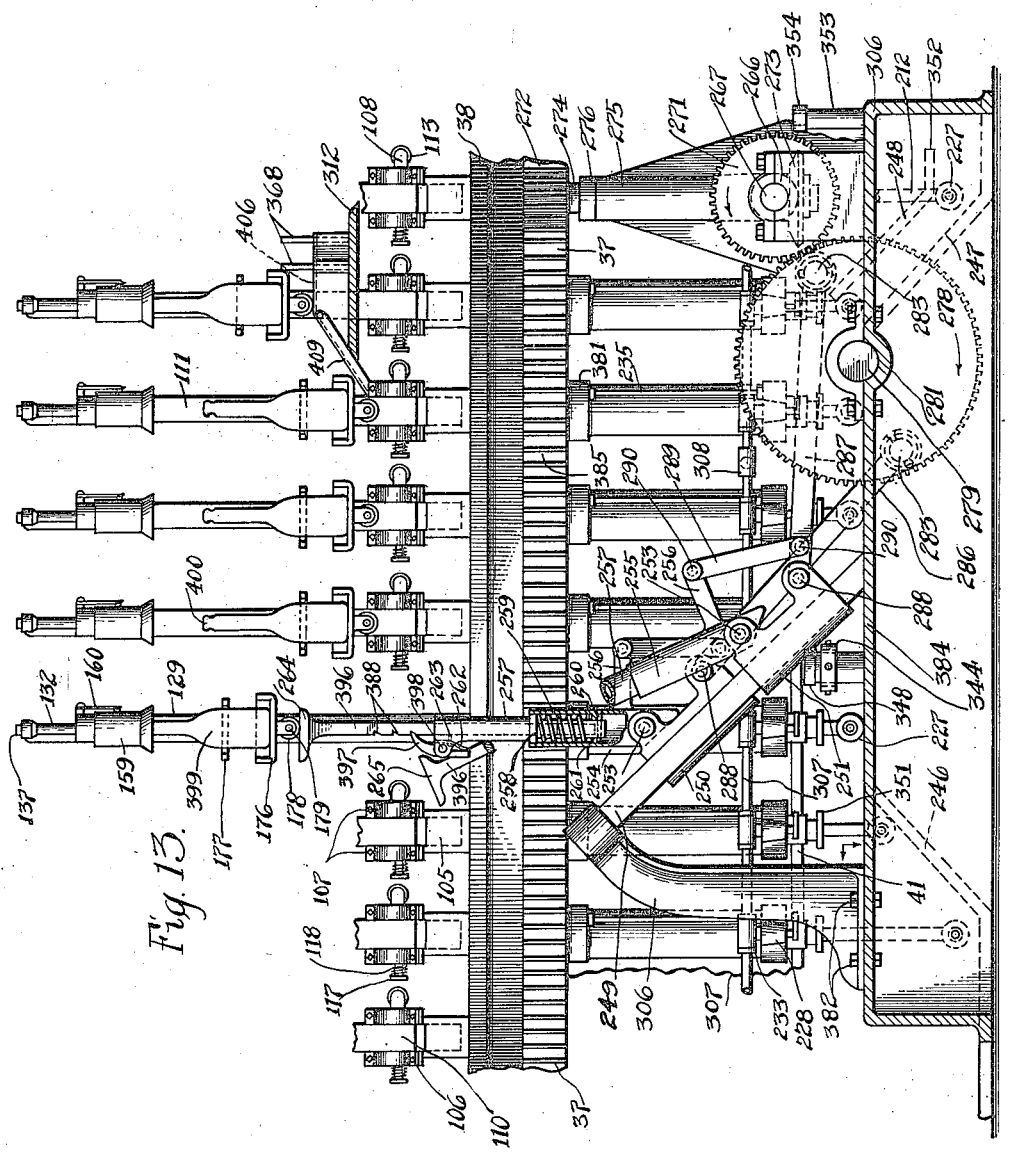

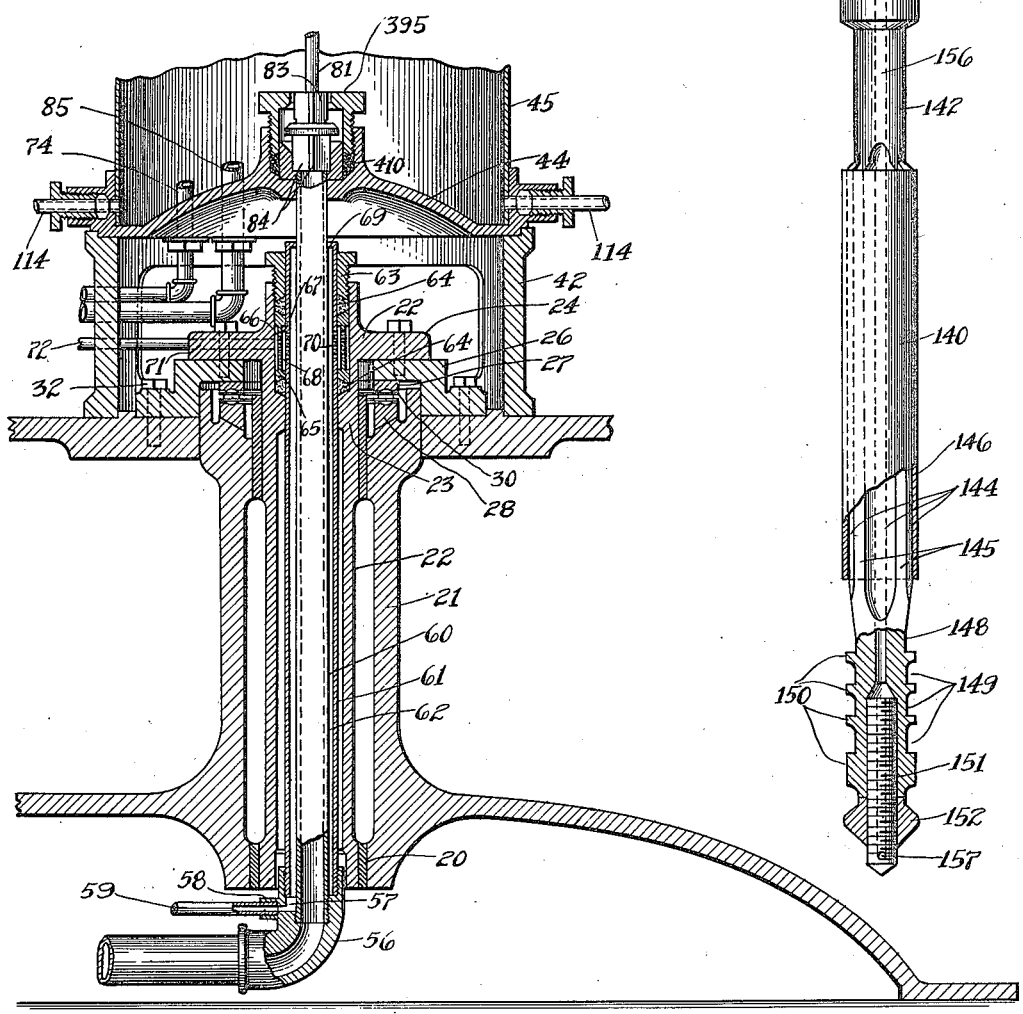

UNITED STATES PATENT OFFICE.

GEORG WEISS, OF CHICAGO, ILLINOIS.

FILLING-MACHINE.

1,224,249.

Specification of Letters Patent.

Patented May 1, 1917.

Application filed April 13, 1914. Serial No. 831,481.

*To all whom it may concern:*

Be it known that I, GEORG WEISS, (who has declared his intention to become a citizen of the United States,) residing in the city of Chicago, county of Cook, and State of Illinois, have invented certain new and useful Improvements in Filling-Machines, of which the following is a specification.

The object of this invention is to provide filling machines of greater efficiency, simplicity of operation, and durability than those heretofore known; and particularly to provide for the propulsion of the machine as an incident to the reclining and righting of the fillers; to provide superior means for the automatic feeding of receptacles into the machine, and for automatic removal of receptacles therefrom; to provide superior means for bringing the receptacles into filling position; to secure a gentler flow of the fluid into the receptacles; to make practicable the filling of receptacles from the tank notwithstanding the level of the fluid in the tank be lower than the mouth of the receptacle; to make the pressure at which the fluid enters the receptacles, substantially constant and independent of variations in the level of the fluid in the tank; to provide simple means for automatically limiting the filling of the receptacles to a given level; to prevent dripping from the fillers after the removal of receptacles therefrom; and to provide simple means for preventing waste in case of the breakage of a receptacle, or in case of a substantial leak therefrom.

In the drawings, Figure 1. is a side elevation, largely sectional, of the principal portion of my improved filling machine, with only two receptacle fillers, and accessories thereto, shown; the other receptacle fillers, and accessories, being omitted to prevent confusion; Fig. 2. is a top plan view of the same machine, with all but one of the receptacle fillers, and appertaining parts, removed, except one filler base, shown in section, and one additional set of supporting brackets, Fig. 3. is a largely sectional detail elevation of the tank of my machine, and parts connected thereto; Fig. 4. is a largely sectional side elevation of one of the receptacle fillers of my machine in erect position, with the same filler shown in reclined position in dotted lines; Fig. 5. is an enlarged top plan view of parts of the front portion of my machine, showing principally arrangements for the automatic feeding and removing of receptacles; Fig. 6. is a front elevation, largely sectional, showing principally the same portions of my machine as are illustrated in Fig. 5; Fig. 7. is a largely sectional side view of the lower part of one of the motor-cylinders of my machine, and of some of the operating mechanism therefor; Fig. 8 is a sectional top view of some of the motor cylinders and adjoining parts in the plane of the top of the control valves therefor; Fig. 9 is a detail side elevation of the rotary star and driving connection therefor which constitutes part of the automatic receptacle feed for my machine; Fig. 10 is a detail top plan view of the parts shown in Fig. 9; Fig. 11 is a front detail view, partly sectional, of one of the receptacle fillers of my machine in erect position; Fig. 12 is a top sectional view of such filler in the plane indicated by line 12—12 in Fig. 4; Fig. 13 is a front view of the mechanism for elevating the receptacle fillers which constitute part of my machine, together with adjacent parts; Fig. 14 is a detail sectional view of the hollow axis of my machine and surrounding portions; Fig. 15 is a detail top sectional view of one of the motor cylinders and the governing valve therefor in the plane indicated by line 15—15 in Fig. 7; Fig. 16 is a partly sectional elevation of the spindle used in my receptacle fillers; Fig. 17 is a sectional detail elevation of the dogs used in my receptacle fillers, and connected parts, showing alternative position in dotted outline; Fig. 18 is a detail elevation of the adjustable bridge onto which the receptacle rests descend; and Fig. 19 is a largely sectional view, in the plane indicated by line 19—19 in Fig. 15, of the upper end of one of the motor cylinders of my machine.

Referring to the drawings, in bushings 20, driven into base 21, is rotatably mounted hollow shaft 22 provided with interior ring flange 23 and exterior ring flange 24. To the latter is attached, by means of screws 25, bearing cap 26 which is supported by hardened bearing rings 27 and 28 between which balls 29 are interposed, mounted in cage 30. To the outer flange 31 of bearing cap 26, is attached, by means of screws 32, rotary disk 33, which is formed with circular hollow boss 34, containing circular chamber 35, provided on its outer face with gear teeth 37. Disk 33 also is provided, above boss 34, with circular bracket 38, and on its lower side with brackets 39, reinforced by ribs 40, which carry circular flange 41.

On disk 33 there is supported by spider 42 tank 43, consisting of base 44, cylinder 45, top ring 46, and cover 47, held down by thumb nuts 48, coöperating with swivel bolts 49 and packing ring 50 to make an airtight joint. Tank 43 is provided with fluid gage 51, pressure gage 52, and air cock 53.

To a fluid-supply pipe 54, provided with shut-off cock 55, is connected elbow 56 into the upper end of which are entered concentric tubes 60 and 61, forming between them air chamber 62, communicating, by means of channel 57, with air supply tube 59 which is threaded into nipple 58 and provided with valve 401. In a circular chamber, formed around the upper portion of tube 61 by shaft 22, between flange 23 and a gland 63, threaded into shaft 22, there is held, between packing rings 64, a collar 65 the middle portion of which is reduced on both sides, so as to form circular air chambers 66 and 67, which are connected with each other by perforations 68. Chamber 62 is closed at its upper end by flange 69, but communicates with chamber 67 by perforations 70. Chamber 66 communicates by channel 71 with air tube 72 to the outer end of which is attached a T 393, for connection with air-tubes 73 and 74, the latter of which is provided with air regulator 75 and enters tank 43, having an outlet at its upper end within tank 43, near the top thereof.

The upper end of tube 60 enters tank 43 through the center of base 44, and is provided with a cylindrical head 76 into which is entered shut-off valve 77. Gland 78, threaded into the upper end of circular boss 79, which projects upward from base 44 and surrounds head 76, serves the double purpose of securing, in connection with packing 410, a fluid-proof joint between stationary head 76 and rotative base 44, and of furnishing, by means of flange 395, a seat for valve 77. A float 80, attached to stem 81 of valve 77 is made of such weight and size that it will prevent any further entry of fluid from tube 60 when the level of the fluid in tank 43 has risen to the level indicated by line 82. Guide plates 83 and 84 are arranged above and below disk 411 preferably so as to each form, when seen from above, a rectangular cross, between the wings of which the fluid from tube 60 may freely flow upward when valve 77 is open. Guides 84 are made of such length as to prevent disk 411 from contact with heads 76. From air chamber 35 there extends into space 301 in the top of tank 43 a tube 85 which enters tank 43 preferably through its base 44, and at its top carries cross tube 86 one end of which is entered into cylinder 87 while the other end connects with vertical tube 88.

Cylinder 87 has its upper end closed by screw plug 89, and has screwed into its lower end valve casing 90 which is provided with valve seat 19 adjoining cylindrical vertical opening 386, and radial perforations 412 which connect opening 386 with air space 301. In opening 386 there is held, by means of guide cross 94, valve 91, provided with ball cup 93 and disk 92 which engages seat 19 in such a manner that it has close contact therewith to the very edge between opening 386 and seat 19. Guide cross 94 fits into opening 386 with a loose fit so that valve 91 may readily be moved upward by adequate pressure from below. In vertical guide tube 97, threaded into the lower end of casing 90, is entered cylindrical float stem 95, of a diameter equal to that of opening 386. This stem carries on its top disk 389, somewhat larger in diameter than opening 386, on its vertical surface collars 98, adapted to bear loosely against the inner walls of tube 97, and at its lower end float bulb 96. This bulb is made of such size and weight that when the fluid in tank 43 is reduced to the level of horizontal line 392, drawn through the lower end of stem 95 just above bulb 96, this bulb will barely hold stem 95 in touch with valve 91. Valve 91 being made of such weight as to equal that of the fluid column displaced by stem 95 between lines 82 and 392, its weight is neutralized by the floating power of stem 95 bearing against it from below, when the fluid in tank 43 reaches the level of line 82, so that, with the fluid in tank 43 at that level, valve 91 opens whenever the air pressure in cylinder 87, and connected passages, is less than that admitted by air regulator 75 to air space 301.

Tube 88 carries at its upper end casing 394, forming the seat of needle valve 100, and through it is connected with air-cock 53, while at its lower end it carries float casing 101 in which is mounted float 103, carrying needle-valve 100, and from the bottom of which tube 102, open at its lower end, extends nearly to the bottom of tank 43.

To circular bracket 38 are fastened, by means of screws 104, filler supports 105, each pair of which, in combination with a pair of clamping plates 106 and appertaining screws 107, forms bearings 108 for trunnions 109 of a base 110 of a receptacle filler 111 which is constructed as follows:—A rectangular member 112 has to its arm 373 connected, by coupling 113, tube 114 (which in turn is suitably connected to the lower edge of tank 43), and has its other, tapering arm 374 held, by threaded pin 116, nut 117 and compression spring 118, in correspondingly tapering chamber 375 which extends horizontally through trunnions 109 and base 110. The contact surfaces between arm 374 and chamber 375 are ground, so as to secure a fluid proof connection, while nevertheless allowing oscillation of base 110. An opening 119 extends from the center of the top of chamber 375, to chamber 120 which is formed in the upper end of base 110, and communicates, when filler 111 is placed into reclined position, by means of slot 121, with fluid channel 122 which extends through member 112 to its connection with tube 114. Another channel 123 extends from the top of base 110, with a right-angle turn, through a projection 124 at the end of which it connects with the interior of a flexible tube 125, and through it and a hollow nipple 126, with air chamber 35. Flexible tube 125 is secured to projection 124 and nipple 126 by couplings 127 and 128, respectively. Into the upper end of chamber 120 is entered a preferably square stem 129 which is perforated lengthwise and the lower end of which forms the seat for a check valve 130. The top of stem 129 has screwed on to it a hollow head 131 which carries cylindrical fillerhead 132 by means of tubular member 133, reinforced by ribs 134. Chamber 302 in head 131 communicates by means of channel 303, in member 133, with the interior of fillerhead 132. Openings in heads 131 and 132 are closed by screw plugs 135, 136 and 137. Into filler head 132 there is entered, and held in position by a screwhead 138, which is spaced from plug 137 so as to form chamber 139, spindle 140 which is so formed and arranged that its portion 141, located immediately below screwhead 138 and extending to the upper limit of channel 303, substantially fills the opening in filler head 132 above channel 303. Below that, for some distance, spindle 140 is reduced to a comparatively slender stem 142, surrounded by chamber 143. This chamber preferably is located, when filler 111 is in erect position, some distance above the level of line 82. Still farther down a number of longitudinal grooves 144 are cut into the circumference of spindle 140, and over ribs 145, remaining between these grooves, a tube 146 is drawn which fits ribs 145 tightly, is of the same outside diameter as portion 141, and extends, together with grooves 142 and ribs 145; some distance down into bell 147 which is formed at the lower end of fillerhead 132. Just below the lower end of grooves 142, ribs 145 and tube 146, spindle 140 is reduced, for a short distance, to the depth of grooves 144, forming annular groove 148 around its circumference. Below this groove 148 spindle 140 is provided with a number of additional annular grooves 149, separated by annular ridges 150. Into the lower end of spindle 140 is threaded with a long thread, pin 151 which is held adjustably in position by locknut 152. The upper end of channel 123 is connected, by a tube 153, with a channel 154 which is formed in a rib 155 extending along the exterior of head 131, member 133 and head 132, and which communicates with chamber 139. From chamber 139 channel 156 extends through the center of spindle 140 and of pin 151 to channel 157, bored at right angles to channel 156 through pin 151 near the lower end thereof. The top of screwhead 138 is formed with a funnel shaped depression 403, the depressed center of which forms the upper end of channel 156. A ball 404 entered in chamber 139, closes this upper end of channel 156 whenever filler 111 is in erect position. Between tube 146 and bell 147 annular rubber cushion 158 is held by frictional contact. Centering bell 159 is slidably mounted on bell 147, being prevented from sliding off by a spring 160, fastened to boss 376, projecting from bell 147, by setscrew 377, and engaging groove 161 in bell 159 by means of wart 378. To stem 129 there is secured, immediately below head 131, by means of clamping plate 162, screw bolts 163, and locknuts 164, forked bracket 165, the forks of which are connected by bridges 166, 167, 168 and 169, and also by pins 170 and 171. Below bracket 165 there are slidably mounted, on stem 129, brackets 172 and 173 which are held together by means of bolts 174 and nuts 175. Bracket 172 is provided with projections 176 and 177, forming, respectively, a receptacle support, having rim 36, and a fork adapted to embrace a receptacle. Below support 176 a roller 178 is rotatably secured to bracket 172 by screw pin 179. Bracket 173 is provided with bosses 180 and 181 in which is fastened, by screws 182, a bar 183, provided with ratchet face 184. A flat bar 185, provided with slot 186, is fastened to bridge 168 by screw 187 and extends through loop 188 of boss 181 with a sliding fit. Between face 184 and bar 185 there extends through the same loop 188 another flat bar 189, the upper end of which is oscillatably connected, by pins 190 and 191 and link 192, with arm 304, of bar 193 which is oscillatably mounted on pin 170. In a slot in bar 189 there are oscillatably mounted, on pin 194, two dogs 195, provided with tails 196, humps 197 and pointed heads 198, made preferably of different length and pushed toward stem 129 by springs 199, fastened to bar 189 by screws 200. To arm 201 of bar 193 is oscillatably connected by link 202 and pins 203 and 204, rod 205, provided with annular shoulders 206, and carrying, between shoulder 206 and bridge 169, compression spring 207. On pin 171 is oscillatably mounted connecting rod 208 the forked lower end of which is oscillatably connected by pin 209, with lever 210, and, by pin 211, with piston rod 212. Forked arm 213 of lever 210 is oscillatably connected, by pins 214, with a sleeve 215 which is adjustably mounted between nuts 216, on the threaded lower end of rod 205. The other arm, 217, of lever 210, is oscillatably connected, by pin 218 with rod 219 extending through an opening in disk 33 and carrying, at its lower threaded end, nut 220 and lock nut 221, and carries, in a threaded eye at its upturned end, screw pin 222 which is adjustably locked in position by lock nut 223. Piston rod 212 extends through cylinder 224, mounted between disk 33 and flange 41, carries piston 225, and has rotatably mounted on its lower end, by means of axle 226, rollers 227 which are held in position by cotter pins 379, and washers 380. Suitable glands and packings are provided to make the chambers of cylinder 224 airtight. In boss 228, projecting sidewise from the lower end of cylinder 224, a tapering valve seat 229 is formed into which is entered tapering valve 230, operated by angular lever 231, secured to valve 230 by screw 232. The upper end of valve seat 229 forms a chamber 305 which is closed by a T 233 which is connected with all similar T's by tubes 307, thus forming a continuous annular channel to which air is supplied by T 308, connecting with tube 73. Another chamber 234, also formed in boss 228, is connected by tube 235 with channel 236 formed in boss 381 projecting from the upper end of cylinder 224 above boss 228, and communicates, through channel 236, with the upper chamber 237, of cylinder 224, and is connected with valve seat 229, some distance below the top of valve 230, by channel 238. At the same level as channel 238 another channel 239 leads from valve seat 229 into lower chamber 240 of cylinder 224, and, also at the same level, channels 241 and 242 lead from valve seat 229 into the open, being located diagonally opposite to channels 238 and 239, respectively. A channel 243 is bored diametrically through valve 230 in such manner as to be capable of connecting either channel 238 and 241, or 239 and 242, with each other; and vertical channels 244 and 245 are formed in the circumferential surface of valve 230 in such manner as to connect chamber 305 with channel 238 when channel 243 is brought into alinement with channels 239 and 242, and with channel 239 when channel 243 is brought into alinement with channels 238 and 241.

At the front of my machine there is formed, on base 21, in any suitable manner, directly under rollers 227, a curved track 383, forming a horizontal bridge 384 and inclines 246 and 247. Above and parallel to incline 247 a double inverted, inclined track 248 is formed, adapted to engage rollers 227 from above, on each side of piston rods 212. Track 248 is provided with horizontal extension 352.

In front of bridge 384 there are fixed, in a suitable frame 306, connected to base 21 by screws 382, parallel slanting bars 249, on which there are slidably mounted cross heads 250 and 251, which in turn carry, oscillatably connected thereto by pins 253, buffer cylinders 254 and 255, provided with arms 256. Buffer-cylinders 254 and 255 have slidably mounted in their upper ends hollow buffers 257 bearing with annular shoulders 258 on buffer springs 259, and limited in their upward movement by pins 260, bearing against partitions 261. In buffers 257 are mounted, with a snug sliding fit, preferably square extension rods 396 which may be adjusted to varying lengths of extension by dogs 397, oscillatably mounted on pins 398, and coöperating with notches 388 in rods 396 with which they are pressed into engagement by springs 262 fastened to buffers 257 by screws 263. At the upper ends of rods 396 are formed, preferably integral therewith, lifting shoes 264 and 265. To the right of bars 249 there is mounted on frame 306, in bearings 266, horizontal shaft 267, carrying pinions 268 and 269, and gear wheels 270 and 271. Pinion 272 and beveled gear 273, both mounted on vertical shaft 274, which likewise is mounted on frame 306, in bearing 275, by the aid of collar 276, are in engagement with gears 37 and pinion 268, respectively. Gear wheels 277 and 278, being both of double the circumference of gear wheels 270 and 271, are fixed on the ends of short shafts 279, which are mounted on frame 306 in bearings 281, and mesh with wheels 270, and 271, respectively. They carry, by means of pins 283, inserted in them in diagonally opposite positions from the axis of shafts 279, and provided with washers 284 and cotter pins 285, driving rods 286 and 287. These rods are oscillatably connected with cross heads 250 and 251, by pins 288, and with arms 256, by bars 289 and pins 290, in such a manner that on each revolution of shaft 267 one of buffer cylinders 254 and 255, together with the buffer 257 and extension rod 396 thereto belonging, is brought into vertical position and projected upward against one of rollers 178, lifting it, and, together with it, all parts connected to corresponding brackets 172 and 173, while at the same time the other buffer-cylinder, and connected buffer and extension, are retracted downward.

In front of bars 249 and wheels 277 and 278, there is mounted, parallel to them, on frame 306, in bearings 291, shaft 292, carrying at one end beveled pinion 293, and near its middle two sets of beveled pinions 294 each pair of which is placed back to back. Pinion 293 is brought, by vertical shaft 295, mounted in bearings 296, by the aid of collar 297, on frame 306, and by pinions 298 and 299, mounted on shaft 295 and meshing with pinions 269 and 293 respectively, into operative engagement with shaft 267. Above shaft 292 there are mounted, in bearings 300, on frame 306, axles 309 which carry at their upper ends flat disks 310, and at their lower ends beveled gears 311, fixed in engagement with pinions 294 preferably in such manner that each of disks 310 and gears 311 rotates in a direction opposite to that in which adjoining disks 310 and gears 311 rotate.

On a table 312 mounted on frame 306 at the same height as the top of disks 310, and provided with suitable openings for said disks, there are fastened, by means of slotted lugs 313, and screws 315, guides 316 so as to form an adjustable receptacle channel 360 running over the top of disks 310 in such a manner that receptacles inserted into the mouth 317 of said channel and pushed on to the nearest disk 310, will automatically be pushed to the other end 318 of said channel and against a rotary star 319 located in front of said end. This star is composed of a sleeve 320, having three sets of double propelling wings 390 arranged at angles of 120° to each other, which is rotatably mounted on a vertical shaft 321 mounted in bearing 322, attached to the underside of table 312, and intermittently rotated by means of a gear wheel 323 driven by a gear 324 which is mounted on the nearest of axles 309. The lower end of sleeve 320 is smooth and rests on shoulder 325 which is integral, and rotates, with shaft 321. The upper end of sleeve 320 is provided with pits 326 which have sloping walls, and into which fit warts 327 projecting from the lower side of a collar 328 which is slidably, but non-rotatably mounted, above sleeve 320, on shaft 321 and pushed into engagement with sleeve 320 by a compression spring 329 which is mounted on shaft 321 above collar 328, and the tension of which may be regulated by the turning of nut 314 and lock nut 330, both threaded onto the upper end of shaft 321, in such a manner that star 319 will ordinarily be rotated in conjunction with shaft 321, by means of the engagement of warts 327 with pits 326; but will fail to be rotated (warts 327 in such case slipping out of, and over, pits 326) if a serious obstruction is interposed, as in the case of a receptacle getting jammed.

The various gear wheels and pinions heretofore mentioned are made of such size with reference to each other and to gears 37, and are arranged so that they will turn in the direction indicated by the arrows marked on them in the drawings; also so that each revolution of shaft 267 corresponds to such rotation of disk 33 as will move each filler 111 forward from any given position so far that said position will be occupied by the next succeeding filler; also so that for each revolution of shaft 267 a full revolution will be made by gear 324 and one-third revolution by gear 323; gear 323 being kept stationary for each half turn of gear 324 by the engagement of non-toothed portion 331 of gear 324 with stops 332 on gear 323. Table 312 being arranged at the same elevation as the upper surfaces of receptacle supports 176, the position of star 319 with reference to gear 323 is so arranged that it will shove a receptacle onto each support 176 passing near it, just in time when such support is in the most favorable position to receive such receptacle by the motion of star 319. A curved wing 333, pivotally attached to the end of one of guides 316, and held yieldingly in position by spring 387, coöperates with star 319 in delivering receptacles to supports 176.

Near star 319 there is oscillatably mounted on table 312, by means of screw bolt 334, horizontal arm 335 which projects in the way of all receptacles placed on any supports 176 that pass by star 319, and which is adapted, when pushed out of the way by any such receptacle, to move arm 337 of a vertical lever 338 which is oscillatably mounted on a horizontal bolt 339, carried by brackets 340 attached to table 312. The other arm 341 of lever 338 carries, by means of pin 342, a rod 343 the lower forked end 344 of which is oscillatably connected, by screws 345, to a sleeve 346 loosely mounted on a vertical roller 347. This roller 347 is provided with an enlarged head 348 and is rotatably and slidably mounted on a vertical pin 349 which projects upward from frame 21 just below the path traversed by arms 351 of angular levers 231 when valves 230 are in such position that they admit air from tube 73 to chambers 240 of their respective cylinders 224, while at the same time connecting chambers 237 of such cylinders with the open air.

Opposite the outer end of extension 352 there is rotatably mounted on frame 21, by means of pin 353, a roller 354 so as to project into the path traversed by arms 355 of angular levers 231 when valves 230 are in such position that they admit air from tube 73 to chambers 237 of their respective cylinders 224 while at the same time connecting chambers 240 of such cylinders with the open air.

Near wing 333 there are attached to table 312, by means of screws 356 and slotted lugs 358, guides 359 and 366 so as to form an adjustable receptacle channel 361. An arm 362, oscillatably connected by vertical pin 363 to the end of guide 359, is projected into the path which is traversed by receptacles carried by supports 176 just before these supports 176 reach a position opposite to star 319. A stout spring 364, attached by rivets 365 to guide 359, bears against a projection 367, of arm 362, in such a way as to ordinarily hold arm 362 in normal position, while nevertheless allowing arm 362 to swing backward into the position indicated by dotted outlines in Fig. 5 if subjected to sufficient pressure to overcome that of spring 364.

Near the upper end of track 248 there project upward from table 312 two pins 368 on which are slidably and detachably mounted, on top of each other, frames 369, 370 and 371 from which project horizontal tracks 404, 405 and 406, respectively. These horizontal tracks connect with inclined tracks 407, 408 and 409, respectively, which, in conjunction, form a continuous incline from track 404 downward to a point below the level of table 312. Frames 369, 370 and 371 are so formed as to constitute no obstacle to the passage of projections 177 and 176 of any fillers 111 which are carried past them in erect position. In this behalf tracks 405 and 406 are so placed that projections 177 and 176 of any such brackets 172 will pass below them, respectively; while tracks 408 and 409 are movably hinged, at their upper ends, on horizontal pins 402, so that they may be lifted to allow the passage of projections 177 and 176 of any fillers 111 carried past them as aforesaid. All three frames 369, 370 and 371 are used when low receptacles are being filled; frame 369 is dispensed with when receptacles of medium height are being filled; and only frame 371 is used when tall receptacles are being filled.

My machine is operated as follows:—

All of receptacle fillers 111 are placed into fully reclined position, except those located above track 383, the rollers 227 of which are placed in contact with track 383. All of valves 230 are turned so as to connect chambers 305 with chambers 237, except those of fillers 111 located at the front of my machine between rollers 347 and 354. Valves 230 of these fillers are turned so as to connect chambers 305 with chambers 240. Brackets 172 and 173, and all attached parts, of all reclined fillers are shoved into the position indicated in dotted outline in Fig. 4. All or part of frames 369, 370 and 371 are placed in position on pins 368, accordingly as low, medium or tall receptacles are to be filled, and rods 396 are also adjusted according to the height of the receptacles to be filled. Air regulator 75 and the number of balls in cup 93, are adjusted to the desired pressures. Valve 55 then having been opened, the fluid from tube 54 will fill tank 43, including tubes 97 and 102 and casing 101, to the level of line 82, and will also fill tubes 114, and channels 122 and 121, and, in the fillers which are reclined (and in the other fillers, as soon as they are reclined), channels 119 and chambers 120, and part of stems 129 until valves 130 are closed. Channel 360 having been filled with receptacles 399, compressed air is thereupon admitted by the opening of valve 401 through tube 59, chambers 57 and 62, perforations 70, chamber 67, perforations 68, chamber 66, channel 71, air tube 72 and T 393, to tubes 73 and 74, the admission to tube 74 being regulated by air-regulator 75 so that air will be admitted whenever the pressure in tube 74 falls below the desired normal, but shut off whenever that normal is reached or exceeded. From tube 74 the following parts are thereupon filled with compressed air at the desired normal pressure:—air space 301, perforations 412, the upper end of tube 97, above the level of line 82, casing 90, cylinder 87, tubes 86 and 88, casing 101, above the level of line 82, tube 85, chamber 35, tubes 125, channels 123, tubes 153, channels 154, chambers 139, and in the fillers which are reclined (their balls 404 having rolled away from the center of their depression 403), also channels 156 and 157, the air, in the case of these reclined fillers, blowing off into the open through channels 157 until receptacles 399 are placed over the openings of these channels, as hereinafter shown. From tube 73 compressed air, at the full pressure supplied, is conducted through T 308, tubes 307 and T's 233 to chambers 305. From thence, in the case of all fillers 111 which are located between rollers 347 and 354 at the front of my machine, compressed air passes through channels 244 and 239 to chamber 240, thereby pushing piston 225, rod 212, and attached rollers 227 upward. Part of these rollers 227 engaging track 248 from below, this will cause rotation of disk 33 in the direction of arrow 385. As a result of this rotation valves 230 of all fillers 111 which pass roller 354, are reversed by engagement of arm 355 with roller 354, so as to place their channels 244 in communication with their channels 239, thereby causing, as fillers 111 successively pass roller 354, their pistons 225 and rods 212 to rise, their rollers 227 to engage track 248, thereby helping to rotate disk 33, and the fillers 111 themselves successively to change from reclined to erect position. Nuts 220 and 221 having been adjusted so that fillers 111 cannot come to fully erect position before nuts 220 will engage the lower side of disk 33, a downward pull is exerted by means of rod 219 on arm 217 of lever 210 just before each filler 111 comes to fully erect position. As a result of this, arm 213, rod 205, and arm 201 are pushed upward, against the pressure of spring 207, and arm 304 and rod 189, together with dogs 195, are pushed downward. This movement causes humps 197 of dogs 195 to engage the lower edge of slot 186, thereby moving their tails 196 away from bar 185, and retracting their heads 198 from engagement with face 184 of bar 183. There being thereupon nothing to hold brackets 172 and 173 in the elevated position indicated in dotted lines in Fig. 4, these brackets, and all parts connected therewith, will slide downward on stem 129 as each filler 111 comes to fully erect position. Even before this happens, ball 404 of each such filler has fallen into the center of depression 403, and shut off any further outflow of compressed air through channels 156 and 157 of such fillers, while about the same time communication between opening 119 and slot 121 of each such filler has been cut off by the rotation of its base 110, incident to placing the filler into erect position, thereby shutting off all further access of fluid to heads 131 and 132, and connected passages.

Tracks 404, 405 and 406 being located where each filler 111 is brought to erect position, roller 178, of each filler 111 thus coming to erect position, drops on the highest one of such tracks that is being used (depending upon the height of the receptacles being filled), and then, in the course of the continued rotation of disk 33, rolls down on the incline formed by all or part of tracks 407, 408 and 409 until brackets 172 and 173 of such filler strike its base 110, while at the same time the upper surface of attached rest 176 reaches the level of the upper surface of table 312, just opposite to the inner end of channel 361. In case for any reason bracket 172 should not have remained in elevated position, but should have slid down into contact with base 110 of the filler to which it is attached, either before such filler was placed into erect position, or because such filler was not reclined (for lack of a receptacle for instance, as shown hereafter), then projections 177 and 176 of such bracket 172, and parts thereto attached, pass under tracks 405 and 406, lifting up hinged tracks 408 and 409 until they have passed beyond them, when such hinged tracks drop back into normal position by their own gravity. As a further result of the rotation of disk 33, through the engagement of teeth 37 with pinion 272, shafts 274, 267, 295, 292 and 309 and the pinions, gears and disks thereto attached, are caused to rotate. By the rotation of disks 310 and star 319, thus occasioned, a receptacle 399 is moved from channel 360 onto each rest 176 as it passes in front of star 319. Each such receptacle thereupon engaging arm 335 and pressing it against arm 337 of lever 338, the other end 341 of lever 338 is raised, together with rod 343 and roller 347, so that head 348 projects into the path of arm 351 of each filler 111 that passes arm 335 with a receptacle 399 on it. This causes valve 230 of each such filler to be reversed from its previous position, so as to bring its channel 245 into communication with its channel 238, thereby admitting compressed air to its chamber 237, and causing its piston 225 to move downward, and its rollers 227 to engage bridge 384 under pressure. Bridge 384 being located so that piston 225 has to descend a short distance before rollers 227 reach bridge 384, rod 219 of each such filler 111 as has passed arm 335 with a receptacle 399 on it, is pushed downward a short distance, thereby disengaging its nut 220 from the underside of disk 33 and permitting its spring 207, while such filler is still held in almost erect position through the engagement of its rollers 227 with bridge 384, to shove its rod 205 downward, and thereby to pull its bar 189 upward a short distance,—enough to raise humps 197 of its dogs 195 above the lower edge of adjoining slot 186, thereby allowing heads 198 of such dogs to be projected forward, by appertaining springs 199, into the path of adjoining ratchet face 184; tails 196 of such dogs engaging adjoining bar 185, and thereby preventing an excessive movement of their heads 198. Any fillers 111 which pass arm 335 without carrying any receptacles 399 on them (by reason of a failure in the supply of such receptacles or by reason of breakage thereof, or otherwise) will not cause arm 335 to move, hence pass roller 347 without its head 348 engaging their arm 351; hence will not be reclined at all; will pass a full revolution of disk 33 in erect position; will not permit either fluid or compressed air to escape; and will not have the heads 198 of their dogs 195 projected into the path of their ratchet faces 184. While fillers 111 pass over bridge 384, after having passed arm 335, their rollers 178 are successively engaged by shoes 264 and 265 of rods 396 and thereby elevated, together with attached brackets 172 and 173, and the receptacles 399 held by them. The degree of extension of rods 396 from buffers 257 is adjusted in accordance with the height of the receptacles 399 used, so that the mouths 400 of such receptacles are pressed into firm engagement with cushions 158; the varying compression of springs 259 making up for any variations in the height of receptacles 399, and also for such niceties of adjustment as cannot be met by the adjustment of dogs 397 to notches 388. With the recession downward, of shoes 264 and 265, brackets 172 and 173 will slide down to their original position, in the case of such fillers 111 as do not carry a receptacle and which for that reason have failed to move arm 335, and have not had the heads 198 of their dogs 195 projected into the path of the ratchet faces 184 of their bars 183. But in the case of such fillers as carry a receptacle and have moved arm 335, and have had the heads 198 of their dogs 195 projected into the path of the ratchet faces 184 of their bars 183, these heads will engage these ratchet faces and will, through the pull continually exerted on bar 189 by the pressure of spring 207 on flange 206, hold brackets 172 and 173, and the receptacles 399 carried thereby, at substantially the highest elevation to which they have been lifted by shoes 264 and 265, notwithstanding the recession of these shoes. Immediately after the lifting of its brackets 172 and 173, and of any receptacle 399 placed thereon, has been accomplished, each filler 111 is brought by the continued rotation of disk 33 over incline 246, with the result that the continued pressure on the top of piston 225 of such of these fillers as carry receptacles, pushes their rollers 227 down this incline, thereby at the same time assisting in the rotation of disk 33, and completing the reclining of each such filler by the pull of its rod 212 on its rod 208 and bracket 165. Pin 222 and nut 223 being so adjusted that the lower end of pin 222 will strike the upper surface of disk 33 before piston 225 has reached its lowest point, there is exerted, by means of pin 209, a downward pull on end 213 of lever 210 which causes, from thence on, rod 205 to pull down on arm 201 of lever 193, thereby causing arm 304 to be elevated, and to pull upward bar 189, and with it, dogs 195, and bar 183, engaged by the heads 198 of these dogs. By means of this pull an additional pressure is exerted for the purpose of keeping mouth 400 of each receptacle 399, carried by a filler thus reclined, in firm and airtight engagement with its cushion 158 until its valve 230 is again reversed by contact of appertaining arm 355 with roller 354. When this happens, and rod 212 of each reclined filler is thereby caused to rise, as hereinbefore described, the downward pull on arm 213 of such filler is relaxed, but mouth 400 of the receptacle 399 carried by such filler is still held in engagement with its cushion 158 by its spring 207 until the filler is brought to fully erect position, whereupon by the engagement of its nut 220 with the underside of disk 33 its heads 198 are disengaged from its face 184, as hereinbefore described, and its brackets 172 and 173 with the receptacle 399 held by them are caused to slide down until its roller 178 engages horizontal track 404, 405 or 406, accordingly as low, medium or tall receptacles are being filled. Roller 178 descending thereupon the incline formed by all or part of tracks 407, 408 and 409, rest 176 of such filler gradually is brought down to the level of table 312, as hereinabove described. At the point where each rest 176 thus reaches again the level of table 312, there projects, into the path of any receptacles carried by it, curved arm 362, which is so shaped that it makes each receptacle brought up to it, slide off such rest 176 and into channel 361 in such a manner that it is pushed into this channel with considerable force by rim 36 of such rest and corresponding fork 177, thereby not only advancing itself into such channel, but also pushing forward, toward the outer mouth of such channel, all receptacles 399 which have preceded it; such receptacles thereupon being removed by hand. As fast as the mouths 400 of receptacles 399, on the reclined fillers, are brought into substantially airtight engagement with cushions 158, they are (provided receptacles 399 be not defective so as to let the air escape) filled with compressed air from channels 157 at the same pressure as the air in cylinder 87. This pressure, as long as tank 43 remains filled with fluid to the level of line 82, is the same as the normal pressure admitted by air regulator 75. If however, for any reason, the fluid in tank 43 falls below the level of line 82, then valve 91 remains closed (by reason of the corresponding loss in floating capacity of stem 95) until the pressure in cylinder 87 and connected cavities, including such receptacles 399 as are brought into airtight engagement with cushions 158, is reduced (by the continual loss of air from channels 157) below the pressure admitted by air regulator 75 to air space 301 sufficiently for such reduction to equalize the reduction in the pressure on the fluid at the bottom of tank 43 and in tubes 114 consequent upon the replacement of part of the fluid in tank 43 by air. Fillers 111 being so arranged that when they are fully reclined, chambers 143 are located below the level of line 82, it is evident that, with the air pressure in reclined receptacles 399 equal to that resting on the fluid in tank 43, this fluid, if its level is maintained at or near that indicated by line 82, will readily flow, by its own gravity, as soon as fillers 111 are reclined, from chambers 120, through stems 129, chambers 302, channels 303, chambers 143, and grooves 144, into such receptacles 399; ridges 150 causing it to run off onto the sides of receptacles 399, instead of flowing down to the lower end of pin 151, where its flow might interfere with the outflow, through channel 157, of the air gradually being displaced from receptacles 399.

In this connection it is to be noted that while receptacles 399 are being filled with compressed air from channels 157, this air and pressure are communicated, through grooves 144, chambers 143, channels 303, and chambers 302, to the interior of stems 129, thereby counterbalancing (unless there is considerable leakage of air from a receptacle 399 by a defect) the fluid pressure resting from below against valves 130 to such an extent that they will open and permit the fluid from tank 43 to enter receptacles 399 by the course described. All of the air displaced (by the inflow of fluid) from the passages and cavities just mentioned, and from receptacles 399, will thereupon be conveyed, through channels 157 and connected passages, back to tube 86. If by reason of such backflow, or for any other reason, the pressure in this tube, and directly communicating passages, is increased so as to even slightly exceed the pressure at which additional air will be admitted by valve 92 from space 301, the fluid level in casing 101 will be depressed below the level of line 82, with the result that needle valve 100 will open, and permit air to escape through air cock 53 until the pressure in casing 101 has been reduced to that at which valve 92 will admit additional air. This functioning of needle valve 100 is substantially independent of any fall of the fluid level in tank 43 below line 82 for the reason that valve 92 is so arranged as to offset any reduction in the fluid pressure at the bottom of tank 43, by a corresponding reduction of the air pressure in casing 101, as heretofore explained. The level of the fluid in casing 101 for that reason is constantly maintained at the level indicated by line 82, except temporarily, in case of back pressure, as shown. If, for any reason, the level of the fluid in tank 43 falls below that indicated by line 82, or even materially below the level occupied by cushions 158 when fillers 111 are in reclined position, the flow of fluid from tank 43 into such receptacles 399 as are in airtight engagement with such cushions, will still continue,—again for the reason that valve 92 is so arranged as to offset any reduction in the fluid pressure at the bottom of tank 43 and in tubes 114, by a corresponding reduction of the air pressure in receptacles 399, as hereinbefore explained. If it is desired to increase the speed of the flow of the fluid from tank 43 beyond the normal, this may be accomplished by placing one or several balls into cup 93; for this will cause the pressure in tube 86 and all connected passages and cavities to be decreased below the pressure prevailing within space 301 even when the fluid in tank 43 is maintained at the level of line 82. As soon as the fluid in receptacles 399 has risen high enough to cover channels 157, no more air can escape through them; but the fluid in receptacles 399 will nevertheless continue to rise until the air displaced by it has filled all of chamber 143, the upper part of channel 303 and grooves 144, displacing all fluid therein, thereby making access of further fluid as well as dripping after the removal of the receptacles, impossible. By the returning of fillers 111 to erect position, all further outflow of air as well as of liquid will be effectively prevented, as heretofore shown. At the same time there will occur a lowering of the fluid level in receptacles 399 (attained as above described) through the withdrawal of spindle 140 and the parts thereto attached. It might be mentioned that no air can be displaced by fluid from the spaces between tubes 146 and the necks of receptacles 399 while their mouths 400 are in airtight engagement with cushions 158. Hence by having tubes 146 extend more or less beyond the lower edge of cushions 158 the limit to be attained by the fluid level in receptacles 399 can be largely regulated. A further means of regulation is provided by the threading of pins 151 into spindles 140, which makes it practicable, in connection with lock nuts 152, to extend pins 151 more or less, thereby raising or lowering channels 157.

I claim:—

1. In a filling machine, horizontally rotary supporting apparatus, in combination with a multiplicity of receptacle fillers mounted on said supporting apparatus so as to be reclinable; piston-rods arranged to place said fillers alternately into reclined and erect position, and to rotate said supporting apparatus; and means for reciprocating said piston rods; substantially as described.

2. In a filling machine, horizontally rotary supporting apparatus, in combination with a multiplicity of reclinable receptacle holders mounted thereon; piston rods arranged to alternately recline and right said receptacle holders and to rotate said supporting apparatus by engaging inclined surfaces; and means for reciprocating said piston rods; substantially as described.

3. In a filling machine, horizontally rotary supporting apparatus, in combination with a multiplicity of filling nozzles mounted thereon; receptacle holders on said supporting apparatus below said nozzles; and means for lifting said holders, comprising a sliding way, an adjustable buffer mounted on said sliding way, and means for reciprocating said buffer; for the purpose described.

4. In a filling machine, horizontally rotary supporting apparatus, in combination with a multiplicity of filling nozzles mounted thereon; receptacle holders on said supporting apparatus below said nozzles; means for lifting said holders, comprising parallel sliding ways, adjustable buffers mounted on said sliding ways, and means for alternately reciprocating said buffers; for the purpose described.

5. In a filling machine, horizontally rotary supporting apparatus, in combination with a multiplicity of filling nozzles mounted thereon; receptacle holders on said supporting apparatus below said nozzles; and means for moving said holders toward said nozzles, comprising a sliding way, an adjustable buffer mounted on said sliding way and provided with a cushion spring, and means for reciprocating said buffer; for the purpose described.

6. In a filling machine, a reclinable filling nozzle having a liquid supply channel and an air channel, and an automatic valve adapted to close the air channel when the nozzle is in erect position, and to open it when the nozzle is in reclined position, substantially as and for the purpose described.

7. In a filling machine, the combination of a liquid supply reservoir; a primary compressed air reservoir freely communicating with said liquid supply reservoir; a secondary compressed air reservoir communicating with said primary compressed air reservoir; a liquid conduit adapted to convey liquid from said liquid supply reservoir to the receptacles to be filled; an air conduit connecting said receptacles with said secondary compressed air reservoir; and a valve, between said primary and secondary compressed air reservoirs, adapted to automatically compensate any lack of the liquid pressure desired for the conveyance of fluid from said liquid reservoir to said receptacles, by a corresponding lowering of the air pressure in the secondary compressed air reservoir below that prevailing in the primary compressed air reservoir.

8. In a filling machine, a filler head having a holding bell for holding the top of the receptacle to be filled, in combination with a centering bell slidably mounted on said holding bell; and a spring having a wart engaging a depression on said centering bell; for the purpose described.

9. In a filling machine, horizontally rotary supporting apparatus, in combination with a reclinable receptacle filler; means for reclining and righting said receptacle filler; a governing valve to control said means; arms on said valve for reversing said valve; and means projected into the path of said arms at certain points of the path traversed by said valve in the rotation of said machine; for the purpose described.

10. In a filling machine, horizontally rotary supporting apparatus, in combination with a multiplicity of reclinable receptacle fillers; means for reclining said receptacle fillers; a governing valve to control said means; a member projecting into the path of empty receptacles placed on said fillers so as to be moved by such receptacles, but not by fillers passing said member without receptacles; and means to cause said governing valve to be moved so as to effect reclining of fillers passing said member with receptacles thereon; substantially as described.

11. In a filling machine, a reclinable receptacle filler in combination with means to recline and right said filler; a receptacle support slidably mounted on said filler; means to elevate said support and any receptacle carried thereon into filling position; dogs coöperating with a ratchet rack on said support to hold said support and receptacle in filling position; means engaging the rotary support on the completion of the reclining and righting of said fillers, and connected with said dogs in such manner as to effect upon the completion of the reclining of said fillers a tightening of the engagement of the receptacle with the filler, and upon the completion of the righting of the filler a disengagement of the dogs from the ratchet rack and a release of the support and receptacle from their elevated position; substantially as and for the purpose described.

12. In a filling machine, a reclinable receptacle filler in combination with means to recline and right said filler; a receptacle support slidably mounted on said filler; means to elevate said support and any receptacle thereon into filling position; dogs coöperating with a ratchet rack on said support to hold said support and receptacle in filling position; and means to cause upon the completion of the righting of the filler a disengagement of the dogs from the ratchet rack; for the purpose described.

13. In a filling machine, a reclinable receptacle filler in combination with means to recline and right said filler; a receptacle support slidably mounted on said filler; means to elevate said support and any receptacle thereon into filling position; dogs coöperating with a ratchet rack on said support to hold said support and receptacle in filling position; and means to cause said dogs to pull said ratchet rack, support and receptacle toward the nozzle of said filler with added force upon and during the complete reclining of said filler.

14. In a filling machine, a reclinable filling nozzle, having a liquid supply channel and an air channel, and an automatic ball-valve, adapted to close the air channel when the nozzle is in erect position, and to open it when the nozzle is in reclined position, substantially as, and for the purpose described.

GEORG WEISS.

Witnesses:
CARL STROVER,
RICHARD M. WINTERS.